United States Patent [19]
Kotaki et al.

[11] Patent Number: 5,852,530
[45] Date of Patent: Dec. 22, 1998

[54] MAGNETIC TAPE DRIVE FOR SINGLE-REEL TYPE MAGNETIC TAPE CARTRIDGE

[75] Inventors: Yoshio Kotaki; Makoto Sasaki; Kazunori Ishiyama, all of Kawasaki, Japan

[73] Assignee: Fujitsu Limited, Kawasaki, Japan

[21] Appl. No.: 974,808

[22] Filed: Nov. 20, 1997

Related U.S. Application Data

[60] Continuation of Ser. No. 608,113, Feb. 28, 1996, abandoned, which is a division of Ser. No. 303,029, Sep. 8, 1994, abandoned.

[30] Foreign Application Priority Data

Sep. 9, 1993 [JP] Japan ................................. 5-224350

[51] Int. Cl.⁶ .................................................. G11B 15/00
[52] U.S. Cl. ................................................................ 360/95
[58] Field of Search ................................ 360/92, 94, 95; 369/36, 38; 242/332.1, 332.4; 226/91, 92

[56] References Cited

U.S. PATENT DOCUMENTS

| | | | |
|---|---|---|---|
| 3,898,695 | 8/1975 | Yabu et al. ................................ | 360/95 |
| 5,099,393 | 3/1992 | Bentlage et al. ......................... | 361/413 |
| 5,293,285 | 3/1994 | Leonhardt et al. ........................ | 360/95 |
| 5,557,484 | 9/1996 | Leonhardt et al. ........................ | 360/95 |

FOREIGN PATENT DOCUMENTS

| | | |
|---|---|---|
| 3105758 | 5/1991 | Japan . |
| 3272046 | 12/1991 | Japan . |
| 5335714 | 12/1993 | Japan . |

*Primary Examiner*—Allen T. Cao
*Attorney, Agent, or Firm*—Greer, Burns & Crain, Ltd.

[57] ABSTRACT

In a magnetic tape drive for a single-reel type magnetic tape cartridge having a leader block coupled to a leading end of a magnetic tape wound therein, a hub for winding the tape pulled out of the cartridge is disposed at rear side of a magnetic head unit for writing data on and reading data from the tape, and has a radial slot formed therein for receiving the leader block of the tape threaded through the unit. The rotational direction of the hub is determined such that the leader block is subjected to an radially-inward force in the slot of the hub at the beginning of a rotational movement of the hub, whereby slippage of the leader block from the slot of the hub can be prevented. A flat flexible printed-circuit cable is-used in the drive to establish an electrical connection between a magnetic head of the unit and an amplifier printed-circuit board thereof, and includes a flexible plate having circuit patterns formed on the side faces thereof and connected to each other by through-holes formed therein, and connectors provided on the side faces of the plate and disposed at the ends thereof. The plate is symmetrically shaped with respect to a geometrical center thereof, and the connectors are symmetrically disposed thereto.

4 Claims, 17 Drawing Sheets

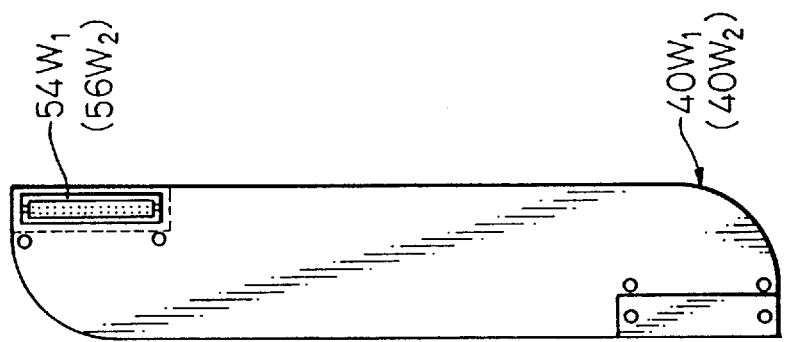
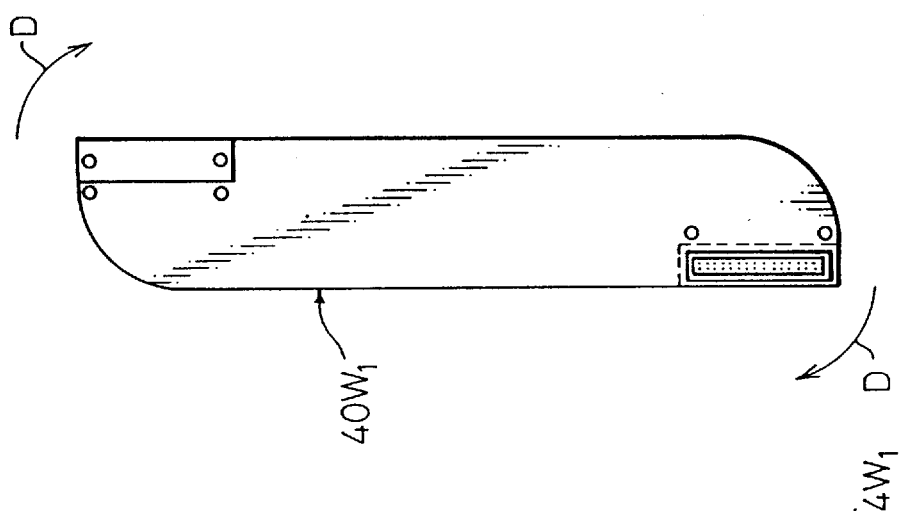
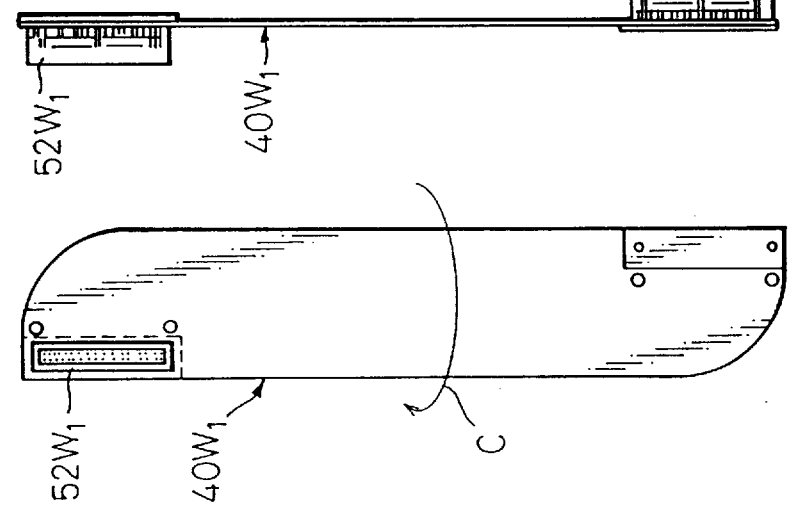

MAGNETIC TAPE DRIVE FOR SINGLE-REEL TYPE MAGNETIC TAPE CARTRIDGE

This application is a continuation of application Ser. No. 08/608,113, abandoned, filed on Feb. 28, 1996 which is a divisional of application Ser. No. 08/303,029, filed Sep. 8, 1994, now abandoned.

1) FIELD OF THE INVENTION

The present invention relates to a magnetic tape drive, for a single-reel type magnetic tape cartridge, which is used as an external memory device of an computer, and more particularly to improvements to such a magnetic tape drive. The present invention also relates to a flexible printed-circuit cable used in the magnetic tape drive to connect a magnetic head to an amplifier control printed-circuit board therefor.

2) DESCRIPTION OF THE RELATED ART

A magnetic tape drive for a single-reel type magnetic tape cartridge is disclosed in, for example, Japanese Unexamined Japanese Patent Publications No. 3-105758 and No. 3-272046. In this field, there is a demand for a magnetic tape drive, as mentioned above, that is as compact as possible and it is also required that the number of the parts in the magnetic tape drive are reduced as much as possible. There remains room for improvements in the compactness of such a magnetic tape drive.

SUMMARY OF THE INVENTION

Accordingly, an object of the present invention is to provide a magnetic tape drive for a single-reel type magnetic tape cartridge directed to reducing the number of parts used therein and to making the entire drive more compact.

Another object of the present invention is to provide a flexible printed-circuit cable for use in the magnetic tape drive to connect a magnetic head to an amplifier control printed-circuit board therefor, which can be used to make the magnetic tape drive more compact as mentioned above.

In accordance with an aspect of the present invention, there is provided a magnetic tape drive for a single-reel type magnetic tape cartridge, the cartridge having a leader block coupled to a leading end of a magnetic tape wound up therein, the drive comprising a magnetic head unit for writing data on and reading data from the magnetic tape, and a hub member disposed at the rear of the magnetic head unit and having a radial slot formed therein for receiving the leader block of the magnetic tape threaded through the magnetic head unit, wherein the rotational direction of the hub member is determined such that the leader block is subjected to an radially-inward force in the radial slot of the hub member at the beginning of a rotational movement of the hub member, whereby slippage of the leader block from the radial slot of the hub member can be prevented.

In accordance with another aspect to the present invention, there is provided a magnetic tape drive for a single-reel type magnetic tape cartridge having a leader block coupled to a leading end of a magnetic tape wound up therein, the drive comprising a magnetic head unit for writing data on and reading data from the magnetic tape, a hub member disposed at a rear side of the magnetic head unit and having a radial slot formed therein for receiving the leader block of the magnetic tape threaded through the magnetic head unit, a data write amplifier printed-circuit board and a data read amplifier printed-circuit board provided below the magnetic head and connected to the the magnetic head of the unit, and at least two flat flexible printed-circuit cables partially disposed between the magnetic head unit and the hub member to establish an electrical connection between the magnetic head of the unit and the amplifier printed-circuit boards, wherein each of the flat flexible printed-circuit cables includes a flexible plate element, and connector elements provided on the side faces of the flexible plate element and disposed at the ends thereof, the flexible plate element having a circuit pattern for connecting the connector elements to each other.

In accordance with yet another aspect of the present invention, there is provided a flat flexible printed-circuit cable to be used in a magnetic tape drive for driving a single-reel type magnetic tape cartridge, to establish an electrical connection between a magnetic head and an amplifier printed-circuit board thereof, comprising: a flexible plate element having circuit patterns formed on the side faces thereof and connected to each other by through-holes formed therein; and connector elements provided on the side faces of the flexible plate element and disposed at the ends thereof, the connector elements being connected to each other by the circuit patterns. Preferably, the flexible-plate element is symmetrically shaped with respect to a geometrical center thereof, and the connector elements are symmetrically disposed with respect to the geometrical center of the flexible plate element.

BRIEF DESCRIPTION OF THE DRAWINGS

The other objects and advantages of the present invention will be better understood from the following description, with reference to the accompanying drawings, in which:

FIG. 19 is a plan view showing a flat flexible printed-circuit cable;

FIG. 20 is a plan view showing the flat flexible printed-circuit cable of FIG. 19 rotated by an angle of 90 degrees;

FIG. 21 is a plan view showing the flat flexible printed-circuit cable of FIG. 20 rotated by an angle of 90 degrees; and FIG. 22 is a plan view showing the flat flexible printed-circuit cable of FIG. 21 rotated by an angle of 180 degrees.

DESCRIPTION OF THE PREFERRED EMBODIMENTS

Figure 1:
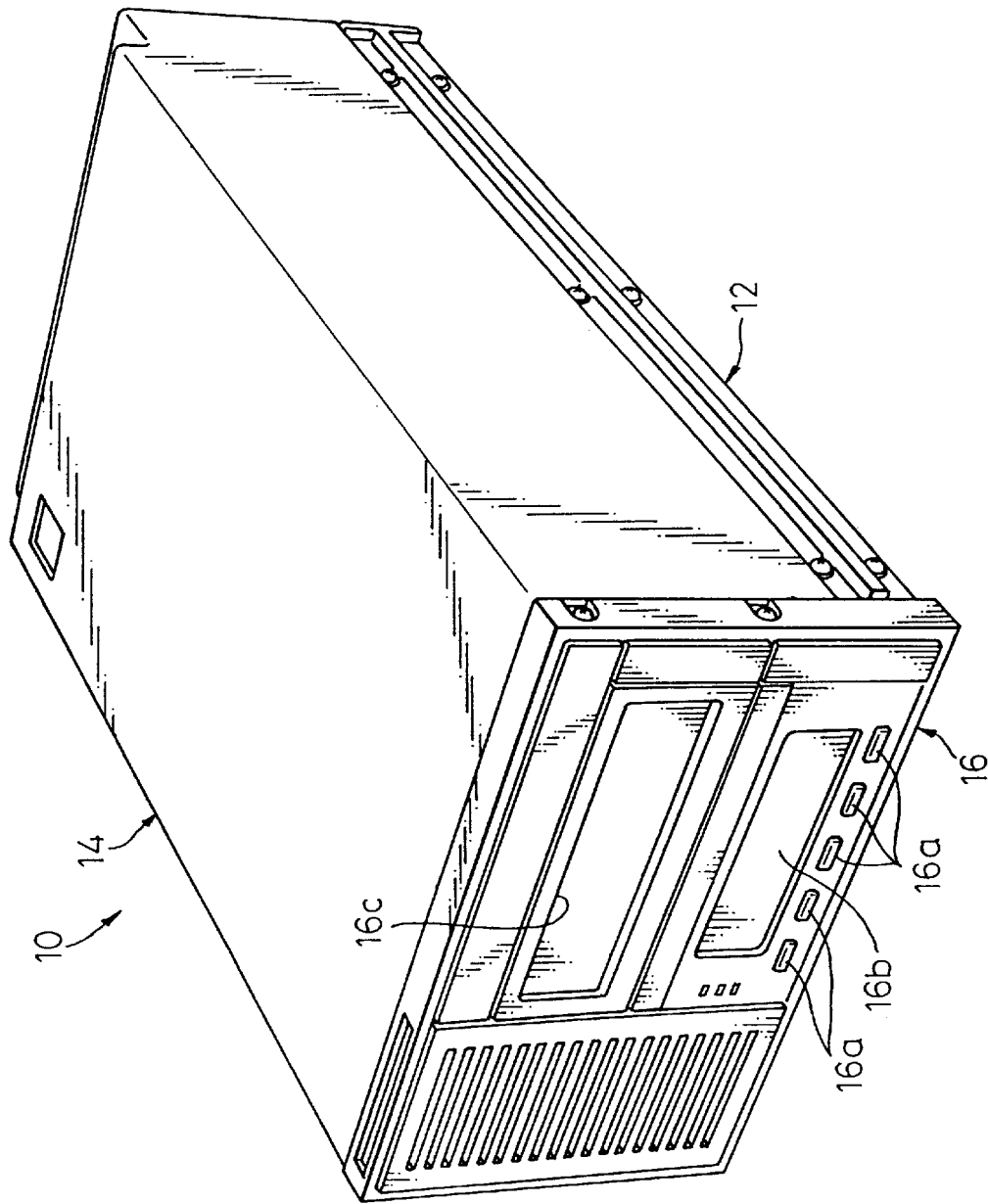
FIG. 1 is a perspective view showing the appearance of a magnetic tape drive according to the present invention.

FIG. 1 shows the appearance of a magnetic tape drive, generally indicated by reference numeral 10, which comprises a main frame 12, a cover 14 detachably attached to the main frame 12, and a front control panel 16 attached to a front side of the main frame 12. The control panel 16 is provided with operating keys 16a, and a liquid crystal display 16b associated therewith. Also, the control panel 16 has an inlet port 16c formed therein to allow insertion of a single-reel type magnetic tape cartridge into the magnetic tape drive 10.

Figure 2:
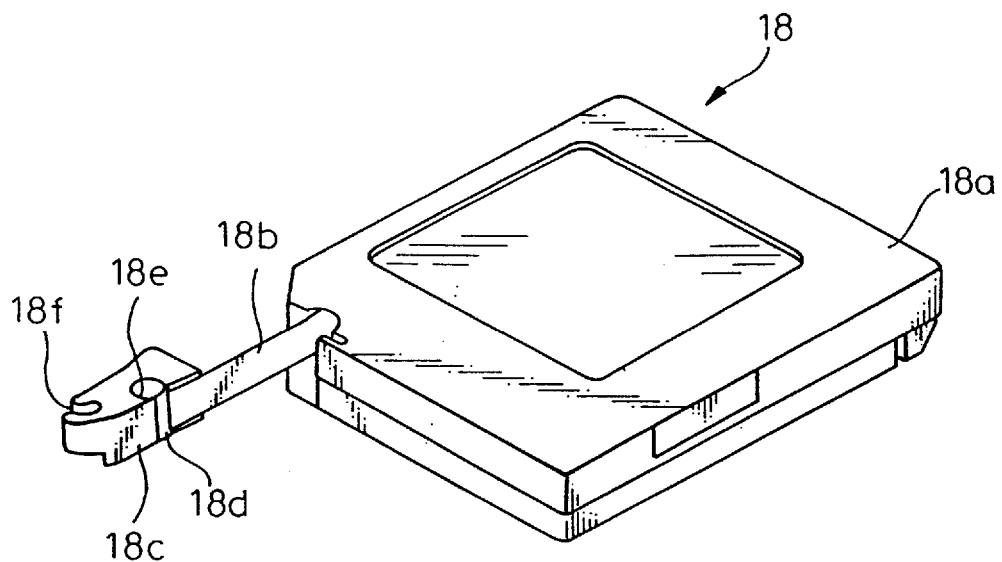
FIG. 2 is a perspective view showing a single-reel type magnetic tape cartridge to be used in the magnetic tape of FIG. 1.

FIG. 2 shows the single-reel type magnetic tape cartridge, generally indicated by reference numeral 18, which comprises a rectangular case 18a having a hub (not visible) rotatably provided therein, and a magnetic tape 18b is wound around the hub. As shown in FIG. 2, the leading end of the magnetic tape 18b is securely coupled to a leader block 18c by a plug-like element 18d which may be formed of a hard rubber material. Namely, the coupling of the leading end of the magnetic tape 18b to the leader block 18c is carried out by forcibly inserting the plug-like element 18d together with the leading end of the magnetic tape 18b into a hole 18e formed in the leader block 18c. As is obvious from FIG. 2, a side wall of the hole 18e is opened, and the magnetic tape 18b is extended from the opened side wall of the hole 18e.

Figure 3:
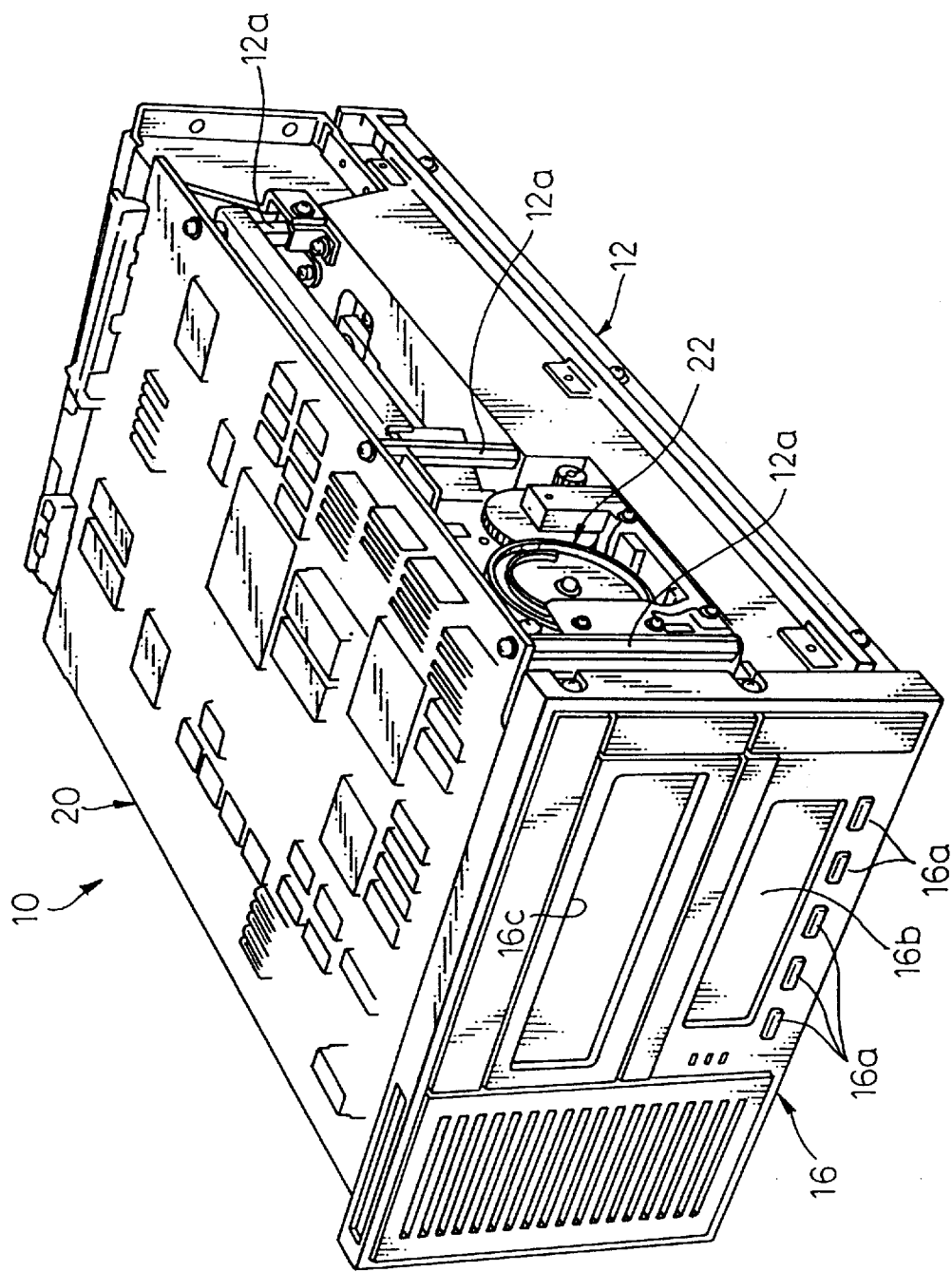
FIG. 3 is a perspective view, similar to FIG. 1, wherein a cover has been removed from the magnetic tape drive shown therein.

In FIG. 3, the cover 14 is removed from the magnetic tape drive 10 shown in FIG. 1, and a main control printed-circuit board 20 for controlling the operation of the drive 10 is shown attached to column elements 12a which forms a part of the main frame 12. Also, in FIG. 3, a loader assembly 22, for moving the single-reel type magnetic tape cartridge 20 to an operational position, is partially visible.

Figure 4:
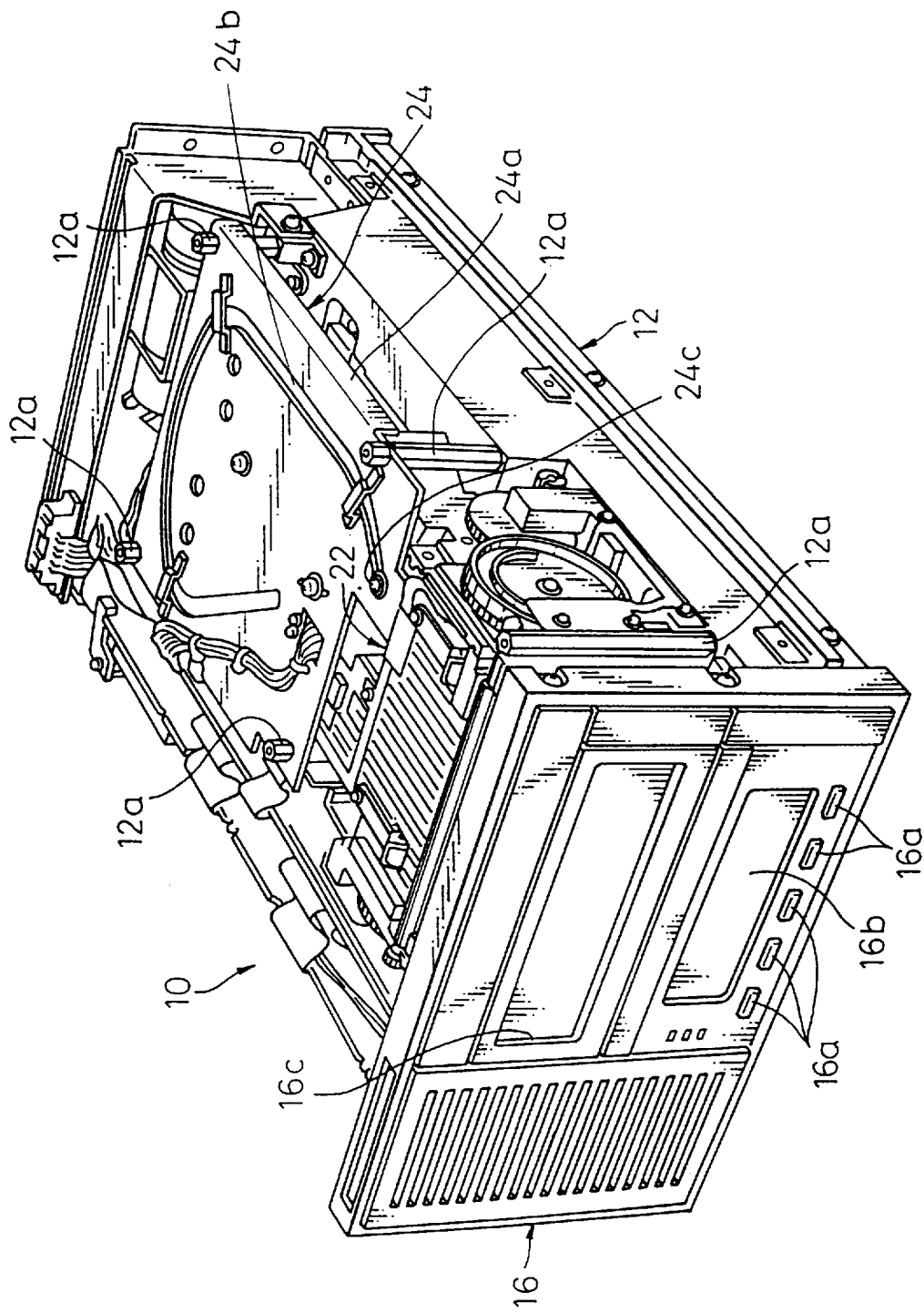
FIG. 4 is a perspective view, similar to FIG. 3, wherein a control printed-circuit board has been removed from the magnetic tape drive shown therein.

In FIG. 4, the main control printed-circuit board 20 is removed from the magnetic tape drive 10 shown in FIG. 3, and a threader assembly 24 for threading the magnetic tape 20b along a given magnetic tape path is visible. The threader assembly 24 includes a guide plate 24a supported by the column elements 12a of the main frame 12, and the guide plate 24a has a guide slot 24b formed therein which extends along with said magnetic tape path. The threader assembly 24 also includes a link/arm mechanism (not visible) provided on a lower side of the guide plate 24a, and the link/arm mechanism has a pin element 24c attached to an end of an arm element thereof. The pin element 24c is slidably received in the guide slot 24b, and is engageable in a recess 18f (FIG. 2) formed in the free end of the leader block 18c.

Figure 5:
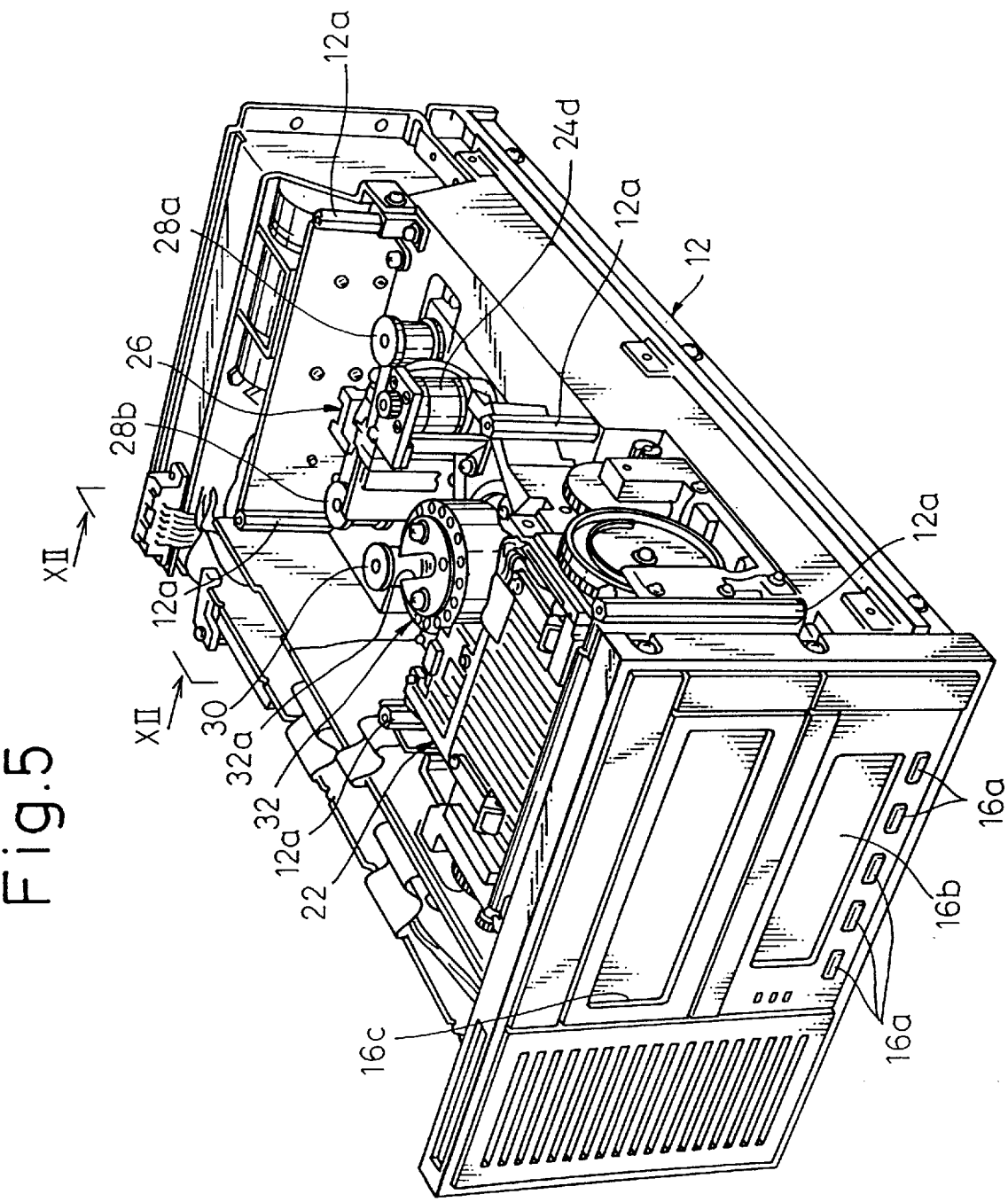
FIG. 5 is a perspective view, similar to FIG. 4, wherein a guide plate of a threader assembly has been removed from the magnetic tape drive shown therein.

In FIG. 5, the guide plate 24a of the threader assembly 24 is removed from the magnetic tape drive 10 shown in FIG. 4, and an electric motor 24d forming a part of the threader assembly 24 is visible. The link/arm mechanism of the threader assembly 24 is driven by the motor 24d such that the pin element 24c is moved along the guide slot 24b of the guide plate 24a. Also, in FIG. 5, a magnetic head assembly 26, a pair of guide rollers 28a and 28b provided on sides thereof, and an additional guide roller 30 provided beside the guide roller 28b are visible, and these elements partially define the above-mentioned magnetic tape path. Further, a hub 32 is visible, and the hub 32 is provided between the loader assembly 22 and the magnetic head assembly 26. The hub 32 has a radial slot 32a formed therein, and the radial slot 32a is sized so as to fitly receive the leader block 18c.

Figure 6:
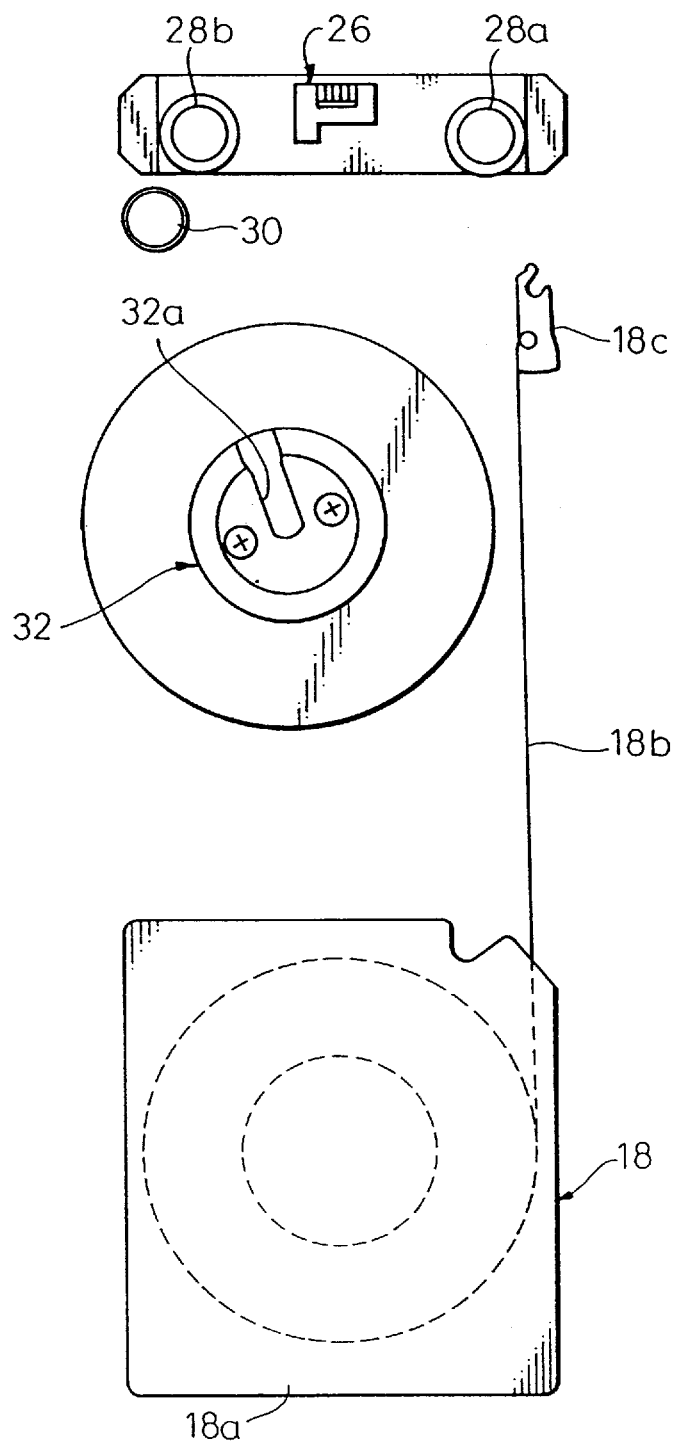
FIG. 6 is a plan view showing the arrangement of the elements necessary for threading a magnetic tape pulled out of the single-reel type magnetic tape cartridge.
Figure 7:
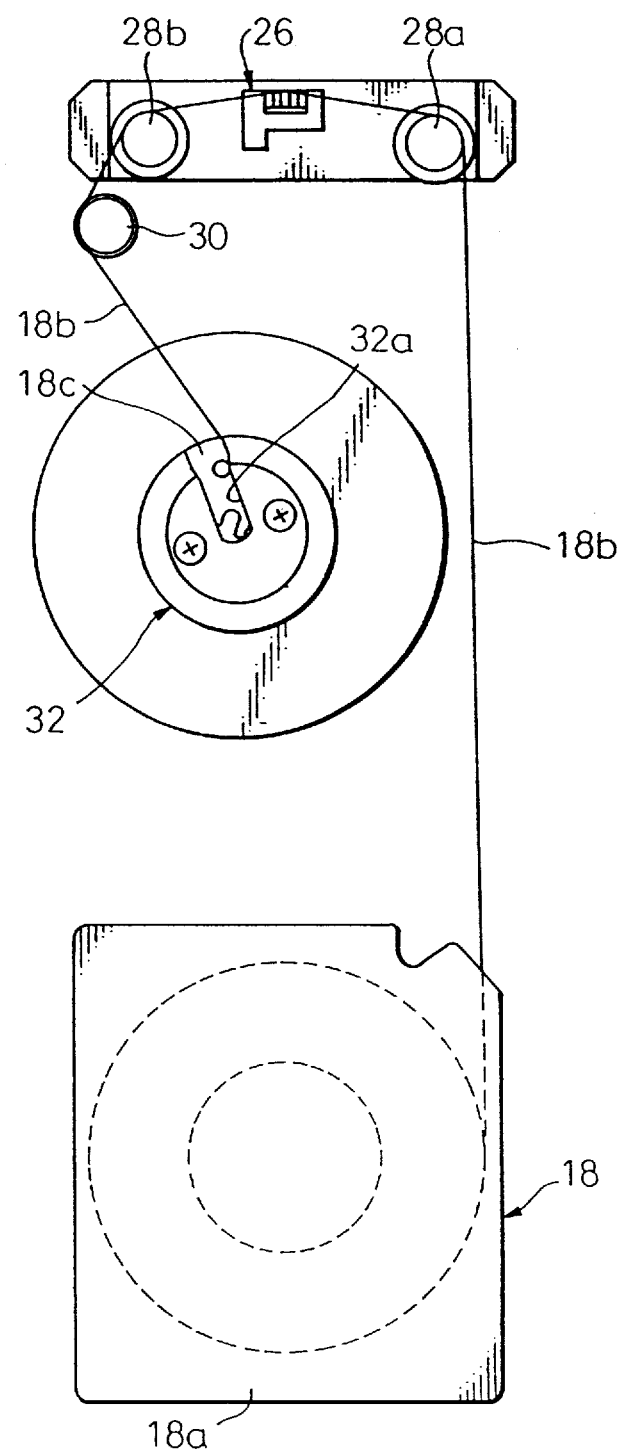
FIG. 7 is a plan view, similar to FIG. 6, in which the threading of the magnetic tape is finished.

When the single-reel type magnetic reel cartridge 18 is loaded in the magnetic tape drive 10, and when the pin element 24c is brought to the end of the guide slot 24b by the link/arm mechanism of the threader assembly 24, as shown in FIG. 4, the pin element 24c can be engaged in the recess 18f of the leader block 18c. Then, the leader block 18c is moved along the guide slot 24b by the link/arm mechanism of the threader assembly 24, so that the magnetic tape 18b is pulled out of the magnetic tape cartridge 18, as shown in FIG. 6. The movement of the leader block 18c along the guide slot 24b continues until the leader block 18c is inserted into the radial slot 32a of the hub 32, so that the magnetic tape 18b is threaded around the guide roller 28a, over the magnetic head assembly 26, and around the guide rollers 28b and 30, as shown in FIG. 7. After the leader block 18c is inserted into the radial slot 32a of the hub 32, the pin element 24c is disengaged from the recess 18f of the leader block 18c, and then the hub 32 is rotated in a direction as indicated by an arrow A in FIG. 8, to write data on the magnetic tape 18b or to read data from the magnetic tape 18b.

Figure 8:
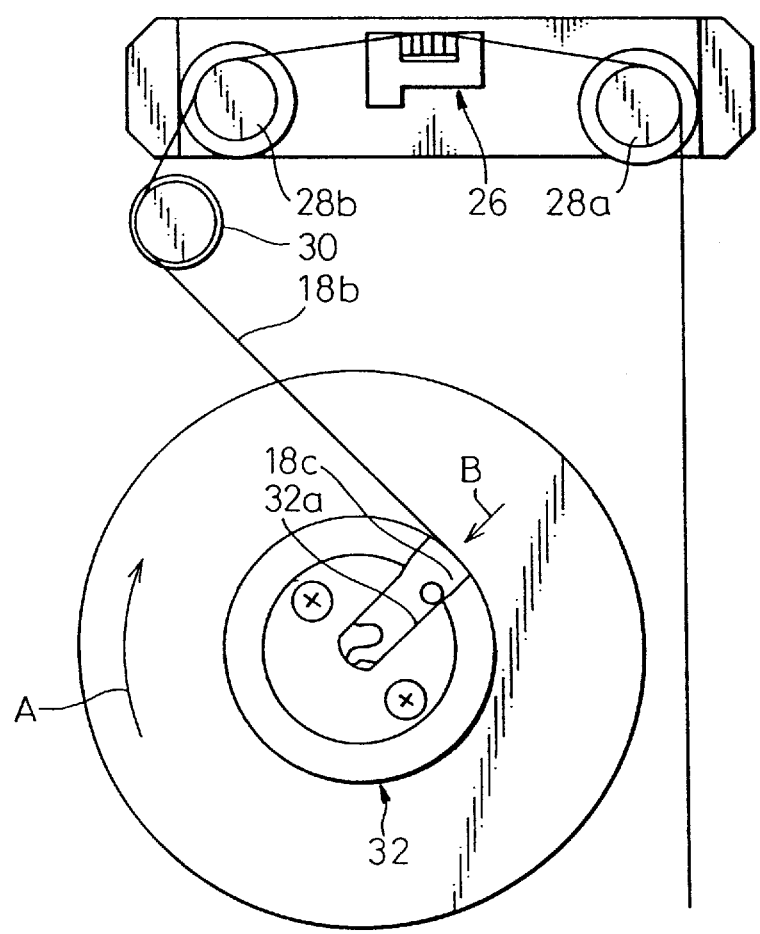
FIG. 8 is a partially-enlarged view of FIG. 7.

The rotational direction of the hub 32 as indicated by the arrow A is significant because slippage of the leader block 18c from the radial slot 32a of the hub 32 can be effectively prevented at the beginning of the rotational movement of the hub 32, due to the fact that the leader block 18c is subjected to a radially-inward force as indicated by an arrow B in FIG. 8, which is derived from a tightening force exerted on the magnetic tape 18b.

Figure 9:
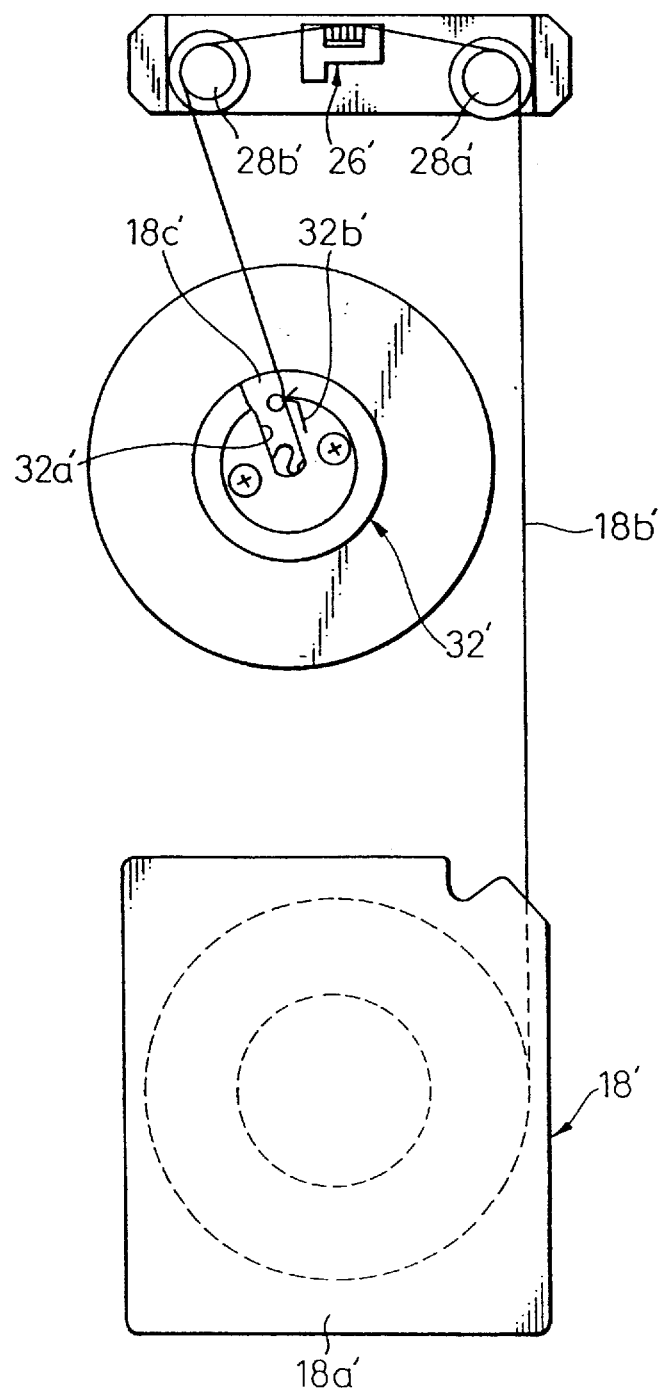
FIG. 9 is a plan view showing a conventional arrangement corresponding to that of FIG. 7.
Figure 10:
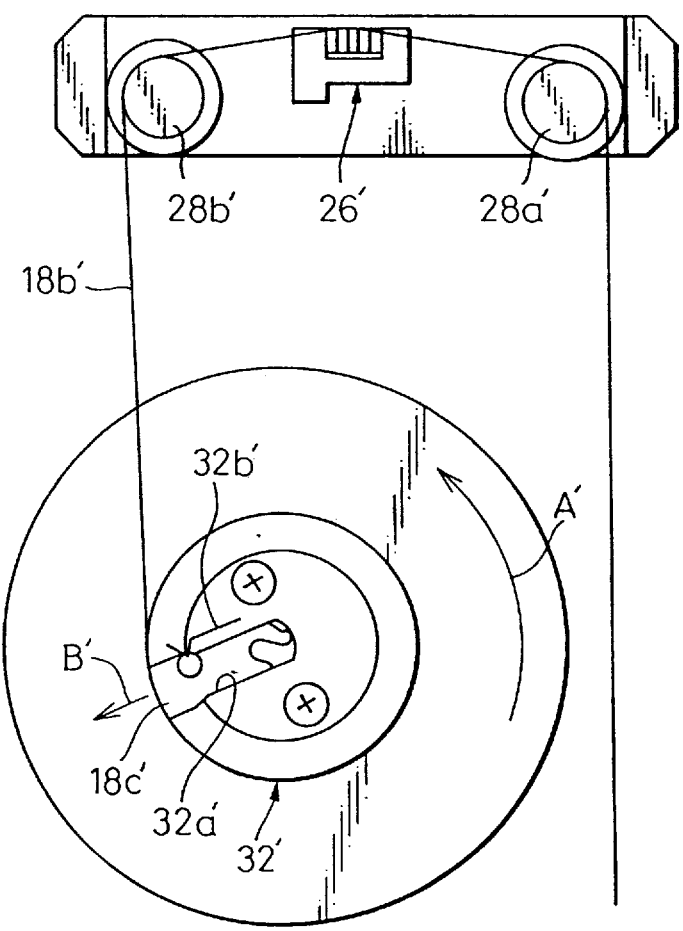
FIG. 10 is an partially-enlarged view of FIG. 9, corresponding to FIG. 8.

FIG. 9 shows a conventional arrangement corresponding to that of FIG. 7, and the elements similar to those of FIG. 7 are indicated by like references primed. In the conventional arrangement, the threading of a magnetic tape 18b' and the insert of a leader block 18c' can be carried out in the same manner as mentioned above, but a hub 32' is rotated in the reverse direction as indicated by an arrow A' in FIG. 10 corresponding to FIG. 8. In this case, slippage of the leader block 18c' from a radial slot 32a' of the hub 32' cannot be prevented at the beginning of the rotational movement of the hub 32', because the leader block 18c' is subjected to a radially-outward force as indicated by an arrow B' in FIG. 10, which is derived from an tightening force exerted on the magnetic tape 18b'. Thus, the hub 32' must have a means for preventing the slippage of the leader block 18c' from the radial slot 32a' of the hub 32'. In the example shown in FIGS. 9 and 10, the hub 32' has a leaf spring element 32b' incorporated therein, as the slippage-preventing means, and the leaf spring element 32b' is engageable with the leader block 18c' upon inserting it into the radial slot 32a' of the hub 32'.

Of course, according to the present invention, with the arrangement as shown in FIGS. 7 and 8, no slippage-preventing means such as a leaf spring element is necessary, because the leader block 18c is subjected to a radially-inward force (arrow B) which results from the tightening force exerted on the magnetic tape 18b.

Note, in the embodiment shown in FIGS. 1 to 8, the hub 32 may be constructed as a double-flanged hub for winding the magnetic tape exactly therearound.

Figure 11:
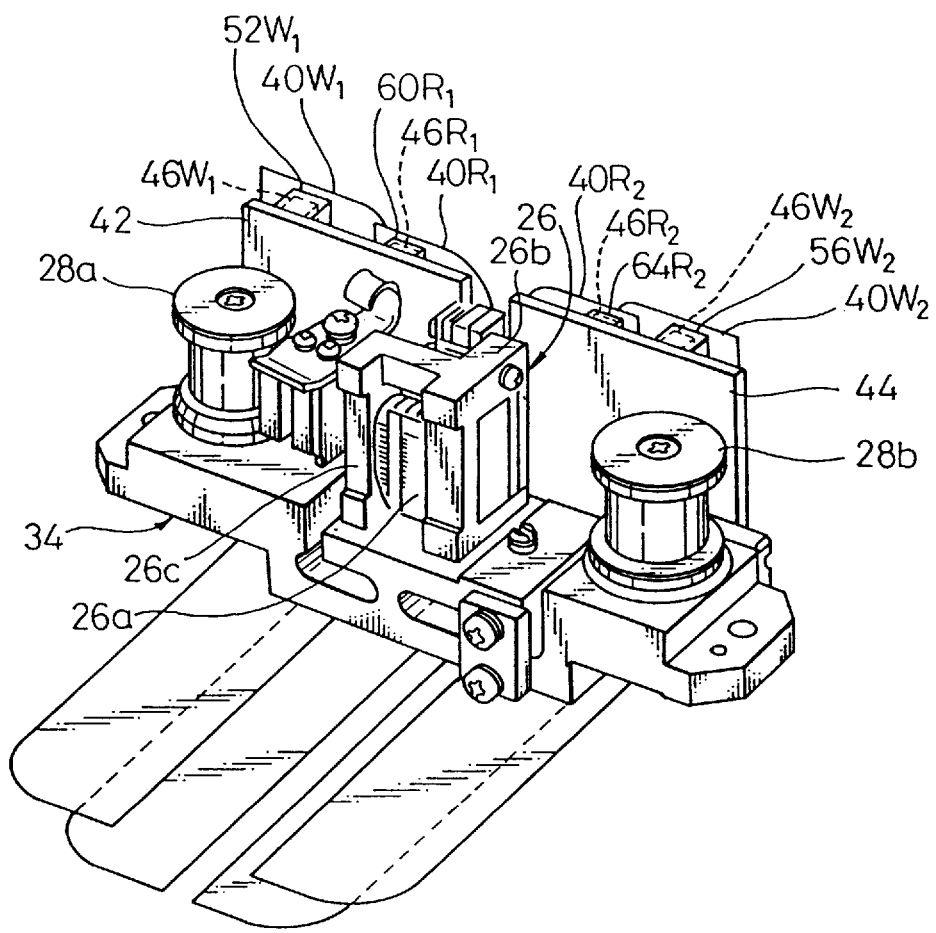
FIG. 11 is a perspective view showing a unit including a magnetic head assembly and a pair of guide rollers mounted on a plate-like base member.
Figure 12:
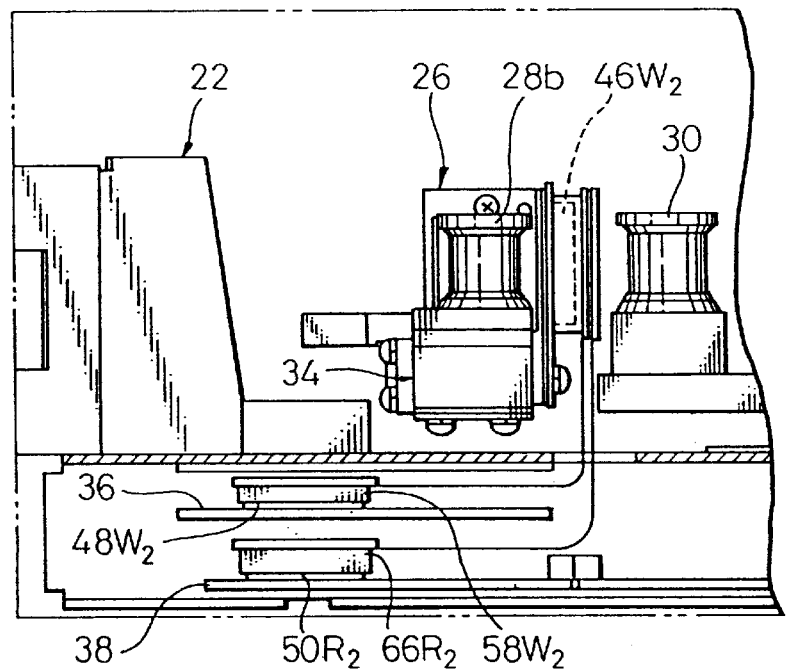
FIG. 12 is a partial cross-sectional view taken along the line XII—XII of FIG. 5; and in the direction indicated generally.
Figure 13:
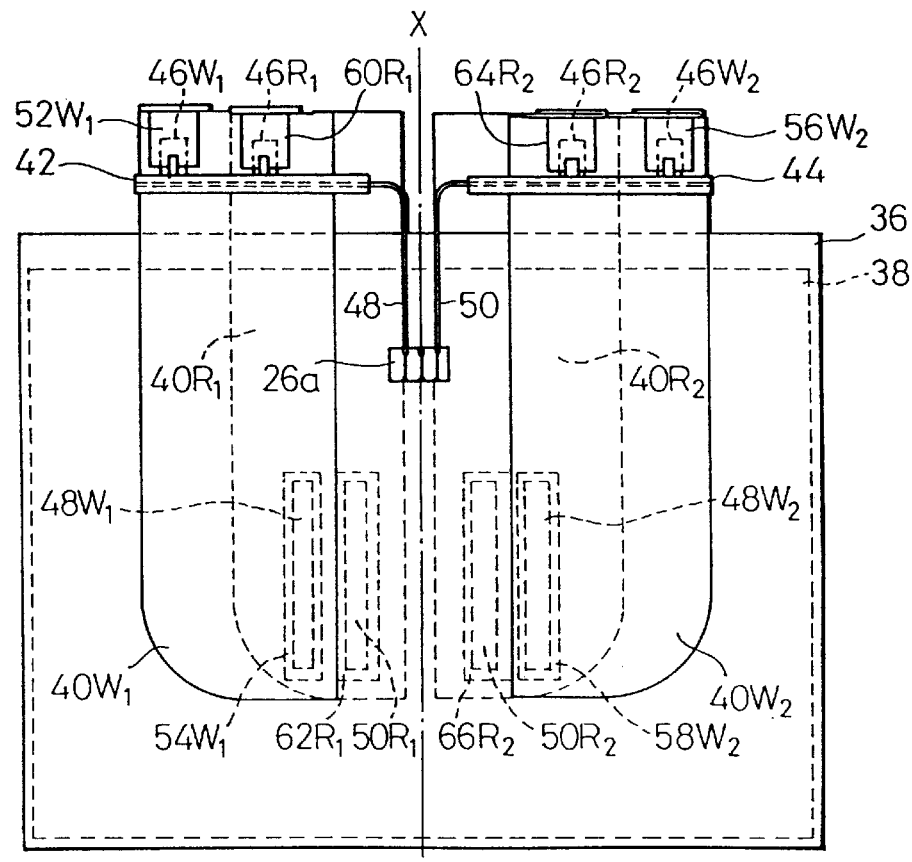
FIG. 13 is a plane view showing an arrangement of a readout amplifier printed-circuit board, a writing amplifier printed-circuit board, and flat flexible printed-circuit cables for connecting a magnetic head to the printed-circuit boards.

As best shown in FIG. 11, the magnetic head assembly 26 includes a magnetic head 26a, and a holder frame 26b for holding the magnetic head 26a, and the holder frame 26b is provided with two guide faces 26c disposed at the sides of the magnetic head 26a, for guiding the magnetic tape 18b. The magnetic head assembly 26 and the guide rollers 28a and 28b are mounted on a plate-like base member 34 as a unit, and the base member 34 is securely attached to the main frame 12 by screws (not shown). As shown in FIGS. 12 and 13, the magnetic head 26a is connected to a data write amplifier printed-circuit board 36 through flat flexible printed-circuit cables $40W_1$ and $40W_2$ for writing data from the magnetic tape, and is also connected to a data read amplifier printed circuit board 38 through flat flexible printed-circuit cables $40R_1$ and $40R_2$ for reading data on the magnetic tape. As shown in FIG. 12, the amplifier printed-circuit boards 36 and 38 are horizontally disposed above and below with respect to each other.

In particular, two small relay printed-circuit boards 42 and 44 are vertically attached to the base member 34, and are symmetrically disposed with a horizontal central axis X passing through the middle of the magnetic head 26a. The relay board 42 has two female type connectors $46W_1$ and $46R_1$ provided on a front side thereof, and the connectors $46W_1$ and $46R_1$ are connected a given circuit pattern formed in the relay board 42. Similarly, the relay board 44 has two female type connectors $46R_2$ and $46W_2$ provided on a front side thereof, and the connectors $46R_2$ and $46W_2$ are connected to a given circuit pattern formed in the relay board 44. As shown in FIG. 13, two bundles of electric wires 48 and 50 are extended from the magnetic head 26a, and are connected to the circuit patterns formed in the boards 42 and 44, respectively. On the other hand, the data write amplifier board 36 has two female type connectors $48W_1$ and $48W_2$ provided thereon and symmetrically disposed with the horizontal central axis X passing through the middle of the magnetic head 26a, and the data read amplifier board 38 also has two female type connectors $50R_1$ and $50R_2$ provided thereon and symmetrically disposed with the horizontal central axis X. The flat flexible cable $40W_1$ has a first male type connector $52W_1$ provided on one side thereof and disposed at one end thereof, and a second male type connector $54W_1$ provided on the other side thereof and disposed at the other end thereof; the flat flexible cable $40W_2$ has a first male type connector $56W_2$ provided on one side thereof and disposed at one end thereof, and a second male type connector $58W_2$ provided on the other side thereof and disposed at the other end thereof; the flat flexible cable $40R_1$ has a first male type connector $60R_1$ provided on one side thereof and disposed at one end thereof, and a second male type connector $62R_1$ provided on the other side thereof and disposed at the other end thereof; and the flat flexible cable $40R_2$ has a first male type connector $64R_2$ provided on one side thereof and disposed at one end thereof, and a second male type connector $66R_2$ provided on the other side thereof and disposed at the other end thereof. As is obvious from FIGS. 11 and 13, the cable $40W_1$ is bent at an angle of about 90 degrees, and the first and second male type connectors $52W_1$ and $54W_1$ thereof are coupled to the female type connectors $46W_1$ and $48W_1$; the cable $40W_2$ is bent at an angle of about 90 degrees, and the first and second male type connectors $56W_2$ and $58W_2$ thereof are coupled to the female type connectors $46W_2$ and $48W_2$; the cable $40R_1$ is bent at an angle of about 90 degrees, and the first and second male type connectors $60R_1$ and $62R_1$ thereof are coupled to the female type connectors $46R_1$ and $50R_1$; and the cable $40R_2$ is bent at an angle of about 90 degrees, and the first and second male type connectors $64R_2$ and $66R_2$ thereof are coupled to the female type connectors $46R_2$ and $50R_2$. Thus, an electrical connection is established between the magnetic head 26a and the amplifier printed-circuit boards 36 and 38.

The arrangement of the flat flexible cables $40W_1$, $40W_2$, $40R_1$, and $40R_2$ bent at the angle of about 90 degrees for establishing the electrical connection between the magnetic head 26a and the amplifier printed-circuit boards 36 and 38 is significant because the distance between the magnetic head assembly 26 and the hub 32 can be decreased and thus the magnetic tape drive can be made more compact. Also, the arrangement of the amplifier printed-circuit boards 36 and 38 disposed above and below with respect to each other is significant because a height of the magnetic tape drive 10 can be decreased.

Figure 14:
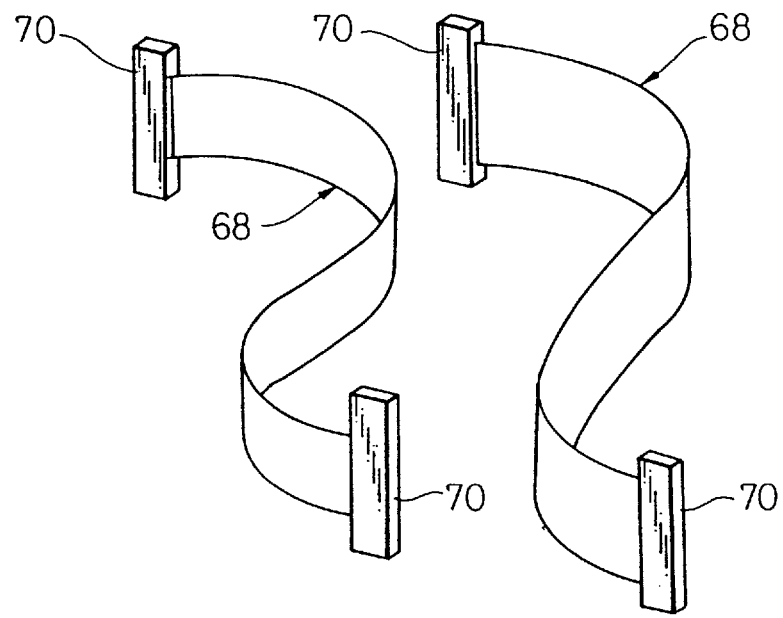
FIG. 14 is a perspective view showing conventional flat flexible printed-circuit cables.
Figure 15:
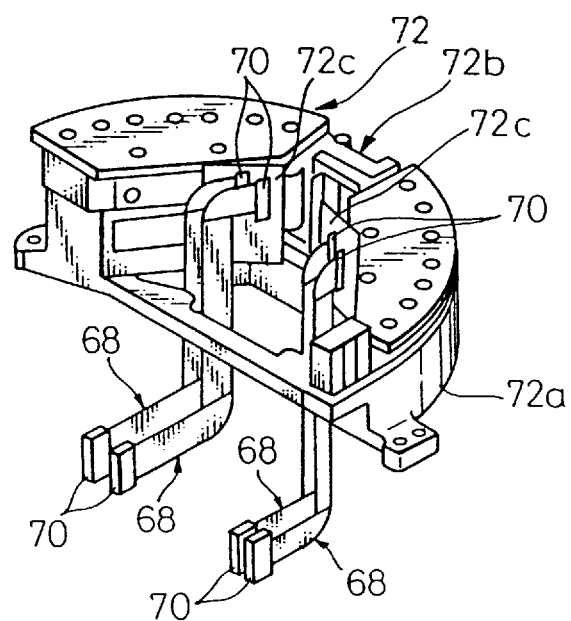
FIG. 15 is a perspective view showing a magnetic head unit in which the flat flexible printed-circuit cables of FIG. 14 are used.

FIG. 14 shows conventional flat flexible printed-circuit cables 68 used in an magnetic tape drive. Each of the flat flexible cables 68 has male type connecters 70 provided at the ends thereof, and is folded at suitable locations thereof in use, as shown in FIG. 15. In FIG. 15, a magnetic head unit 72 includes a semi-circular-shaped tape guide member 72a, and a magnetic head assembly 72b incorporated in the guide member 72a, and the magnetic head assembly has two relay printed-circuit boards 72c associated therewith, which may be constituted in the same manner as the above-mentioned relay printed-circuit boards 42 and 44. Each of the flat flexible cables 68 are folded and arranged to establish an electrical connection between an magnetic head of the assembly 72b and amplifier printed-circuit boards (not shown). As is obvious from FIG. 15, the conventional arrangement of the folded flat flexible printed-circuit cables 68 is very bulky, and does not allow the size of the magnetic tape drive to be reduced.

It should be noted that the rotational direction of the hub 32 as indicated by the arrow A (FIG. 8) is made possible by using the flat flexible printed-circuit cables $40W_1$, $40w_2$, $40R_1$, and $40R_2$, without any bulkiness of the magnetic tape drive 10. Namely, this is because the flat flexible printed-circuit cables $40W_1$, $40W_2$, $40R_1$, and $40R_2$ can be compactly arranged even though the space between the magnetic head assembly 26 and the hub 32 is restricted due to the existence of the additional tape guide roller 30.

Figure 16:
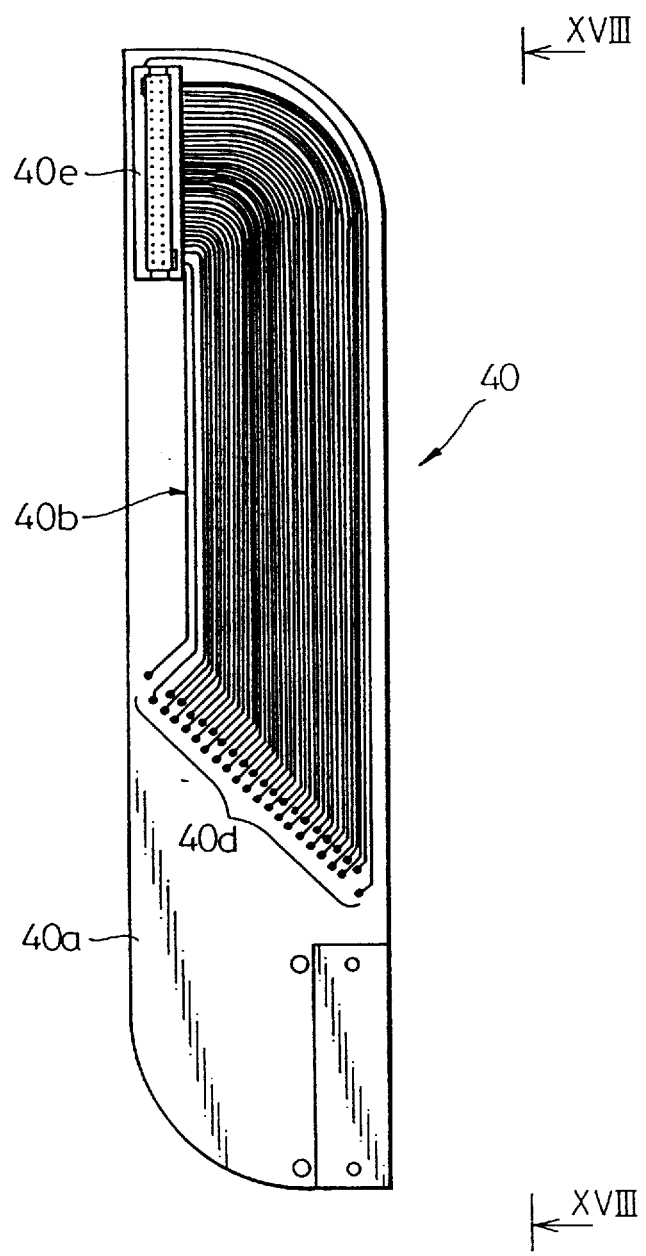
FIG. 16 is a plan view showing a preferable form of a flat flexible printed-circuit cable according to the present invention.
Figure 17:
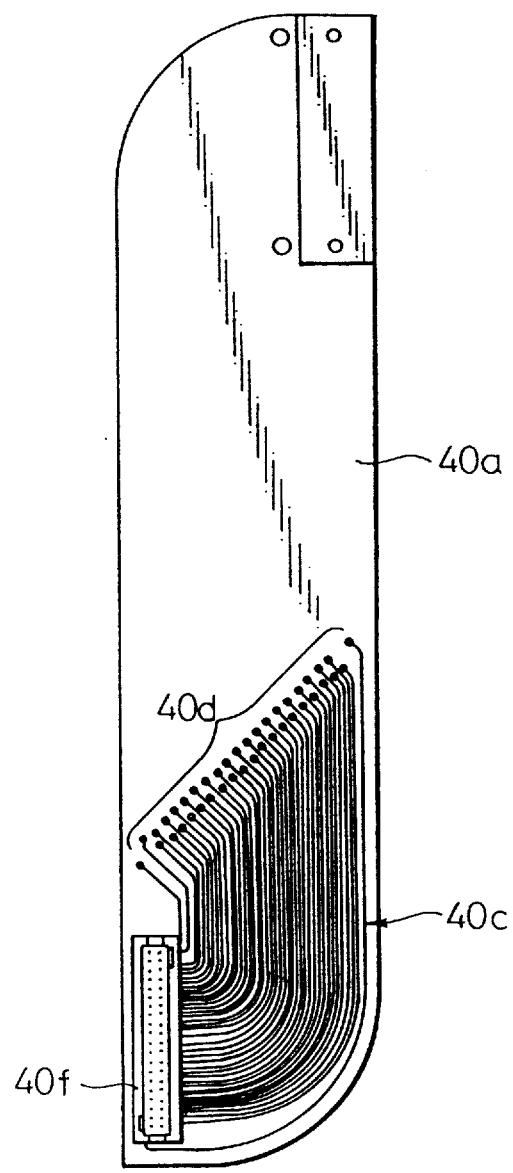
FIG. 17 is a plan view showing the rear side of the flat flexible printed-circuit cable of FIG. 16.
Figure 18:
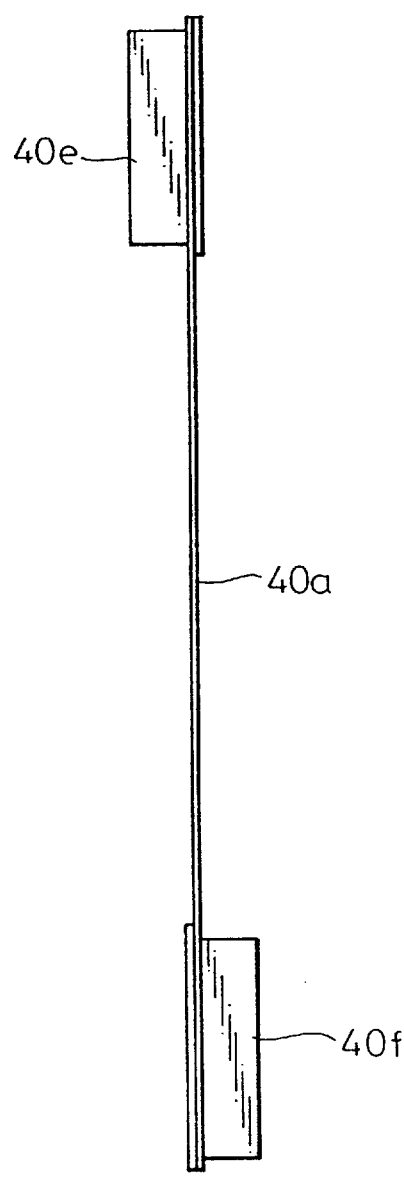
FIG. 18 is a side view observed along a line XVIII—XVIII of FIG. 16; and in the direction indicated generally.

FIGS. 16, 17, and 18 show a preferable form of the flat flexible printed-circuit cable ($40W_1$, $40W_2$, $40R_1$, and $40R_2$), and this preferable flat flexible cable, generally indicated by reference numeral 40, comprises a flexible plate element 40a symmetrically shaped with respect to a geometrical center thereof and having respective circuit patterns 40b and 40c formed on the side faces thereof. As illustrated in FIGS. 16 and 17, each of the circuit patterns 40b and 40c includes a plurality of fine conductive segments, the fine segments forming the pattern 40b are connected to the fine segments forming the pattern 40c by through-holes 40d formed in the flexible plate element 40a. Note that, of course, the pattern 40b, 40c is preferably covered by a protective layer. The flat flexible cable 40 also comprises a first male type connector 40e and a second male type connector 40f provided on the side faces of the flexible plate element 40a and symmetrically disposed at the ends thereof with respect to the geometrical center, as shown in FIG. 18. The connector 40e is connected to the fine conductive segments forming the pattern 40b, and the connector 40f is connected to the fine conductive segments forming the pattern 40c.

When the flat flexible printed-circuit cables $40W_1$, $40W_2$, $40R_1$, and $40R_2$ are constituted as the flat flexible printed-circuit cable 40 shown FIGS. 16, 17, and 18, the flat flexible cables $40W_1$, $40W_2$, $40R_1$, and $40R_2$ are exchangeable with each other due to the symmetrical arrangement as mentioned above. In particular, for example, when the flat flexible cable $40W_1$ as shown in FIG. 19 is turned over as indicated by arrow C, it successively takes attitudes as shown in FIGS. 20 and 21. Then, when the flat flexible cable $40W_1$ as shown in FIG. 21 is rotated to an attitude as shown in FIG. 22, as indicated by arrow D (FIG. 21), it can be used as the flat flexible cables $40W_2$. Namely, the establishment of electrical connection between the magnetic head 26a and the amplifier printed-circuit boards 26 and 26 can be carried out by using only one sort of flat flexible printed-circuit cables.

Finally, it will be understood by those skilled in the art that the foregoing description is of a preferred embodiment of the disclosed invention, and that various changes and modifications may be made to the present invention without departing from the spirit and scope thereof.

We claim:

1. A magnetic tape drive for a single-reel type magnetic tape cartridge having a leader block coupled to a leading end of a magnetic tape wound therein, said drive comprising:

a magnetic head unit for writing data on and reading data from the magnetic tape;

a hub member disposed in spaced relationship with said magnetic head unit, said hub member having a radial slot formed therein for receiving the leader block of the magnetic tape threaded through said magnetic head unit;

a first guide member arranged downstream of the magnetic head relative to the path of the tape from the tape cartridge to said hub member; and a second guide member arranged between said first guide member and said hub member to bend the course of the tape along a bending direction;

said hub member being rotated in a direction in which said radial slot substantially faces said second guide member and then moves toward a side of said second guide member opposite to the side of said second guide member in which the course of the tape is bent, wherein said hub member has a predetermined rotational movement along a first direction, said predetermined rotational movement ensuring that the leader block is covered by the tape and preventing slippage of said leader block from said radial slot by a pressing force exerted by the magnetic tape as said hub member is rotated.

2. The magnetic tape drive as set forth in claim 1, wherein said magnetic head unit further includes a magnetic head for writing data on and reading data from the magnetic tape.

3. The magnetic tape drive as set forth in claim 2, wherein said hub is disposed between said magnetic head and a location where the magnetic tape cartridge is loaded into the magnetic tape drive.

4. A magnetic tape drive as set forth in claim 1, wherein said hub member is positioned between said magnetic head unit and the magnetic tape cartridge.

* * * * *